(12) United States Patent
Klauer et al.

(10) Patent No.: US 8,674,241 B2
(45) Date of Patent: Mar. 18, 2014

(54) WEIGHING DEVICE HAVING A PLURALITY OF DIGITAL WEIGHING CELLS PROVIDING DIGITAL MEASUREMENT VALUES AND ASSOCIATED TIME VALUES TO A CENTRAL CONTROL UNIT, WEIGHING CELL, AND METHOD

(75) Inventors: Alfred Klauer, Goettingen (DE);
Christian Oldendorf, Goettingen (DE);
Thomas Schink, Goettingen (DE);
Erich Bettwieser, Goettingen (DE)

(73) Assignee: Sartorius Weighing Technology GmbH, Goettingen (DE)

( * ) Notice: Subject to any disclaimer, the term of this patent is extended or adjusted under 35 U.S.C. 154(b) by 916 days.

(21) Appl. No.: 12/795,103

(22) Filed: Jun. 7, 2010

(65) Prior Publication Data

US 2010/0263940 A1  Oct. 21, 2010

Related U.S. Application Data

(63) Continuation of application No. PCT/EP2008/009528, filed on Nov. 12, 2008.

(30) Foreign Application Priority Data

Dec. 5, 2007  (DE) .......................... 10 2007 058 919

(51) Int. Cl.
*G01G 19/00* (2006.01)
*G01G 19/393* (2006.01)
*G01G 23/28* (2006.01)

(52) U.S. Cl.
USPC ............ 177/1; 177/25.13; 177/199; 702/173; 340/666

(58) Field of Classification Search
USPC ........ 177/1, 25.11–25.19, 199, 200; 702/101, 702/102, 173–175; 340/666, 667
See application file for complete search history.

(56) References Cited

U.S. PATENT DOCUMENTS 4,570,728 A * 2/1986 Toyoda ...................... 177/25.18
4,691,290 A * 9/1987 Griffen ......................... 702/173

(Continued)

FOREIGN PATENT DOCUMENTS

EP  0319202 A2  6/1989
EP  0342561 A2  11/1989

(Continued)

OTHER PUBLICATIONS

Rauchschwalbe, U., "Digitale Waegezellen: Innovation oder Marketing-Gag?" Waegen, Dosieren, Mischen, Issue 1, Mar. 2007, pp. 11-15.

*Primary Examiner* — Randy W Gibson
(74) *Attorney, Agent, or Firm* — Sughrue Mion, PLLC

(57) ABSTRACT

A weighing device having a plurality of digital weighing cells (164), each including a sensor connected to a force transmission unit (163), each generating a digital measurement value corresponding to a transmitted force at a measurement time point, and including a data processing device that converts the digital measurement values to transmission units configured to be transmitted over a data communications line (20) to a central control unit (18) connected to all weighing cells for analysis of the transmission units. The central control unit (18) calculates a digital combination value based on the transmission units originating from the various weighing cells (164), the combination value representing a weight force with which the weighing device (16) is loaded at a weighing time point. The conversion of the measurement values to transmission units involves a pairing of each converted measurement value with a time value.

20 Claims, 1 Drawing Sheet

(56) References Cited

U.S. PATENT DOCUMENTS

| | | | |
|---|---|---|---|
| 4,804,052 A * | 2/1989 | Griffen | 177/25.14 |
| 4,844,187 A * | 7/1989 | Jabero | 177/5 |
| 4,889,201 A * | 12/1989 | Oldendorf et al. | 177/25.14 |
| 5,210,706 A * | 5/1993 | Nishiyama | 702/41 |
| 5,226,496 A * | 7/1993 | Feinland et al. | 177/25.15 |
| 6,433,288 B1 * | 8/2002 | Olafsson | 177/145 |
| 6,591,222 B2 * | 7/2003 | Stiner | 702/173 |
| 7,211,748 B2 * | 5/2007 | Lauke et al. | 177/199 |
| 7,247,801 B2 * | 7/2007 | Salazar et al. | 177/1 |
| 2002/0161549 A1 * | 10/2002 | Stiner | 702/173 |
| 2005/0121236 A1 * | 6/2005 | Lauke et al. | 177/144 |

FOREIGN PATENT DOCUMENTS

| | | |
|---|---|---|
| EP | 0418567 A1 | 3/1991 |
| WO | 99/36753 A1 | 7/1999 |
| WO | 02/27281 A1 | 4/2002 |

* cited by examiner

WEIGHING DEVICE HAVING A PLURALITY OF DIGITAL WEIGHING CELLS PROVIDING DIGITAL MEASUREMENT VALUES AND ASSOCIATED TIME VALUES TO A CENTRAL CONTROL UNIT, WEIGHING CELL, AND METHOD

This is a Continuation of International Application PCT/EP2008/009528, with an international filing date of Nov. 12, 2008, which was published under PCT Article 21(2) in German, and the complete disclosure of which, including amendments, is incorporated into this application by reference.

FIELD AND BACKGROUND OF THE INVENTION

The present invention relates to a weighing device having a plurality of digital weighing cells, each comprising
- a sensor connected to a force introducing device and configured to generate a digital measurement value corresponding to an imparted force at a measurement time point,
- a data processing device configured to convert the digital measurement values to transmission units for transmission over a data communications line, and to transmit the transmission units to a central control unit connected to each of the weighing cells for analysis of the transmission units, wherein the central control unit calculates a digital combination value based on the transmission units originating from each of the various weighing cells, and wherein the combination value represents a weight force which is exerted upon the weighing device at a weighing time point.

The invention also relates to a method for determining a digital combination value which represents a weight force which is exerted upon the weighing device at a weighing time point, comprising:
- requesting, with a central control unit, a digital measurement value from each of a plurality of weighing cells, each of the weighing cells having (i) a sensor connected to a force introducing device, and (ii) a data processing device,
- in each of the plurality of weighing cells:
  - generating, with the sensor, a digital measurement value corresponding respectively to an imparted force at a measurement time point,
  - converting, with the data processing device, the digital measurement value to a transmission unit configured to be transmitted over a data communications line, and
  - transmitting, with the data processing device, the transmission unit to the central control unit for analysis, and
- calculating, with the central control unit, the digital combination value based on the transmission units originating from the various weighing cells.

Weighing devices and methods of this type are discussed in the article by Rauchschwalbe, U.: "*Digitale Wägezellen: Innovation oder Marketing Gag?*", wdm: wägen, dosieren, mischen, issue 1, March 2007.

Industrial weighing devices typically comprise a plurality of weighing cells which support a weighing platform at different positions. A weight force acting on a weighing platform is generated via the force introducing device of each weighing cell to the sensor thereof, which generates a partial measurement value. A suitable combination of the partial measurement values results in the combination value which represents the overall weight force that acts on the weighing platform.

In many known devices, the sensors are analog sensors which generate an analog electrical voltage at their output. Parallel connection of all the analog weighing cells supporting the weighing platform corresponds to an addition of the voltages to a combination voltage. The analog combination voltage is typically digitized in devices of this type and is passed on as a series of digital values for further processing or analysis.

Replacing such analog weighing cells with digital weighing cells which, in view of the modularity of the system and the avoidance of error-prone analog lines, would be desirable. However, such replacement leads, as discussed in detail in the aforementioned article, to various difficulties. Digital weighing cells generate digital measurement values at predetermined measurement time points. The sensor of a digital weighing cell typically also comprises one or more analog force transducers, for example, strain gauges, which generate an analog voltage that is converted by an analog-to-digital converter (ADC) of the sensor into a sequence of individual digital measurement values, wherein each digital measurement value represents the force applied to the force transducer at the measurement time point. In order to combine the digital measurement values of a plurality of weighing cells, the individual values must be sent via a data communications line to a central control unit and further processed there. For this purpose, conversion of the measurement values to transmission units which can be transmitted via the data communications line is required. A widely used standard interface for digital weighing cells is the serial RS 485 interface, by which the information relating to the measurement values is transmitted according to a standardized protocol. Other interfaces and bus systems are also possible, wherein the conversion of the measurement values to transmission units must always be carried out to suit the communications network used.

As distinct from the analog case where the combining of measurement values is achieved with the parallel connection of the cells without any time delay, in the case of digital weighing cells, the chronological matching of the values to be combined is particularly significant. Typically, therefore, the digital weighing cells operate in a synchronized manner wherein the synchronization is brought about for example with a synchronizing pulse from the central control unit, requesting all the weighing cells to generate a digital measurement value simultaneously and then sequentially requesting the measurement values which have been temporarily stored in the individual measuring cells. The sequentially requested measurement values are then processed in the central control unit to form a combination value which is assigned to the synchronization time point. In this way, a sequence of individual chronologically allocated combination values is formed in the central control unit, representing a sampled progression of the weight force exerted upon the weighing platform. A disadvantage of this system is the substantial length of the interval between individual combination values, which increases as the number of weighing cells to be taken into account rises. This is disadvantageous for dynamic weighing processes, just as it is for dosing procedures in which precise and rapid predictability of the progression of the weight force exerted upon the weighing devices is of essential importance.

Although dispensing with the synchronization of the measurement time points can lead to acceleration of the speed of the combination value updating, which is then dependent only on the speed of the data communications line and the central control device, each combination value is based on individual measurement values which have been recorded at different measurement time points, which leads, particularly in the case of dynamic processes, to significant inaccuracy in the measurement result.

The aforementioned article proposes an at least partial return to analog weighing cells. In order to avoid errors it is proposed, in particular, to pass the analog signals via a short analog communications line to a multi-channel ADC which digitizes the analog input signals on all channels synchronously and combines the digital values generated. A disadvantage of this concept is the loss of modularity gained by introducing the digital weighing cells and the reintroduction of analog line sections with their known error and calibration problems.

OBJECT AND SUMMARY OF THE INVENTION

It is therefore an object of the present invention to provide a weighing device and a method which enable a result which represents the weight force exerted to be obtained in a more rapid and error-free predictive manner with a weighing device having digital weighing cells.

According to one formulation, this object is addressed in that the conversion of the measurement values to transmission units comprises pair formation with, in each case, one converted measurement value with a time value which represents the associated measurement time point, and in that the central control unit estimates a chronological progression of the force exerted upon a single weighing cell from a plurality of such pairs each associated with said weighing cell and generates the combination value by combining estimated values for various weighing cells that each correspond to the weighing time point in the estimated force progressions.

According to a further formulation, converting a measurement value into a transmission unit or analyzing the transmission unit comprises a pair formation of the measurement value with a time value determined with some form of timer and representing the associated measurement time point, that the step of calculating the digital combination value comprises estimating chronological progressions of the forces imparted into individual weighing cells from a plurality of such pairs. In addition, generating the combination value comprises combining estimated values for various weighing cells that each correspond to the weighing time point in the estimated force progressions.

Advantageously, the invention, firstly, avoids the necessity for synchronous recording of the measurement values that are to be combined and, secondly, avoids combining measurement values recorded at different times. The measurement values are therefore handled as value pairs comprising the actual measurement value and the associated measurement time point for each weighing cell, and the progression of the force actually imparted into the measuring cell is very accurately estimated or predicted by interpolation and/or extrapolation. The estimation is carried out, for example, based on known fitting methods using one or more models for the force progression of the individual weighing cells and/or for the overall force progression. Methods of this type are known to persons skilled in the art per se and with regard to their advantages, disadvantages and accuracies in individual cases. Estimation produces the estimated progressions of the force imparted into each individual weighing cell as a function of time. The estimated functions are generally based, for each weighing cell, on other key points, i.e., on measurements carried out at different time points. The combination value which represents the overall weight force acting on the weighing device can be derived at any arbitrary time point from the estimated force progressions, in that the estimated values which correspond to a common weighing time point of interest in all the weighing cells in the estimated force progressions of all the weighing cells are combined with each other. The combination is typically carried out by addition of the corresponding estimated values. However, other combination methods are fundamentally conceivable if, for example, special arrangements or configurations of the individual weighing cells require such a combination which deviates from simple addition. Determination of the combination value is dependent on whether the weighing time point corresponds to a particular measurement time point of one or more weighing cells.

An advantage associated with the present invention lies therein that, regardless of the updating rate of the measurement values and without any necessity for synchronized measurement value recording, output of very accurate combination values essentially as rapidly as desired is made possible.

Advantageous embodiments of the invention are disclosed and claimed herein.

In a preferred embodiment of the invention, it is provided that the central control unit estimates, from a plurality of combination values, a chronological progression of the weight force exerted upon the weighing device and predicts a future time point of reaching a target weight force. This embodiment is particularly suitable for carrying out dosing procedures. As mentioned, the estimation of the force progressions can be carried out not only by interpolation between existing key values, but also as an extrapolation which relates to force progressions that are to be expected. This enables the prediction of future combination values or, by reverse calculation, the determination of a future time point at which a desired weight force is reached. Knowledge of this time point makes it possible to control adjusting elements of a dosing device which have a dead time in a timely manner in order to end the dosing procedure on reaching a target weight force.

Favorably, the data processing device of one of the weighing cells serves as the central control unit. Modern weighing cells are equipped with very small but efficient microprocessors which, apart from their actual task, specifically that of preparing and converting the measurement values, are capable of performing additional tasks without difficulty, such as the estimations described above, and determining the combination value. If such an already existing data processing device is used as the "master" or "central control unit," then a separate device can be dispensed with and costs can thereby be saved.

As mentioned above, typical weighing cells are based on analog detection of an imparted force and subsequent digitization by means of an ADC. The sensor of a weighing cell therefore typically comprises a force transducer which generates an analog electrical signal corresponding to the imparted force, and an analog/digital converter which generates the digital measurement values corresponding to the analog signal. However, the present invention is not restricted to such weighing cells. Systems which are directly measurable digitally are also usable without difficulty.

In a preferred embodiment of the invention, the data processing device of each weighing cell generates the time values. This suggests itself since typical data processing devices have, in any event, a clock which can be used as a timer. For example, it is possible, in order to determine a time value representing a measurement time point, for a time difference between a start control signal transmitted by the central control unit to the weighing cell and the measurement time point to be determined. Thus, for example, the individual measuring cells can be sequentially interrogated by the central control unit, wherein each interrogation begins with the transmission of a start control command. The weighing cell then carries out a measurement and prepares the transmission unit as a value pair from the measurement value and a value for the time elapsed between the start control command and the actual measurement, as measured with the built-in timers. From this information and from knowledge of the time point of the start control command, the central control unit can determine the absolute measurement time point and base the force progression estimation thereon.

In this embodiment, the sequential interrogation of the weighing cells can also take place in an interlaced manner in that, for example, one measuring cell is triggered to start measuring by transmitting the start control command and the central control unit communicates with other weighing cells while the first-mentioned cell carries out the generation and conversion of the measurement value. The transmission of the transmission unit can then take place when the central control unit returns to the first weighing cell.

Alternatively, the timers of all the weighing cells can be synchronized with one another. There is then no need for synchronization communication between the central control unit and the weighing cells, since the relation of the time values arising from various weighing cells is always correct by virtue of the weighing cell synchronization.

In a fundamentally different embodiment of the invention, the timer is part of the central control unit. In this embodiment, the central control unit must initiate each measurement in the weighing cells and determine the actual measurement time point from a known reaction time of the weighing cell. This variant is preferably usable for real time-capable systems.

BRIEF DESCRIPTION OF THE DRAWINGS

Further features and advantages of the invention are disclosed in the following detailed description and the drawings, in which.

DETAILED DESCRIPTION OF PREFERRED EMBODIMENTS

Figure 1:
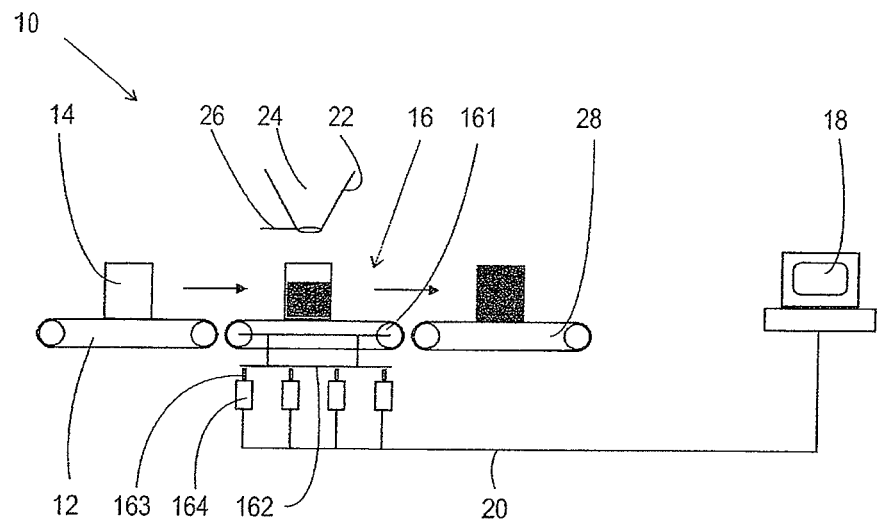
FIG. 1 is a schematic representation of an exemplary application of the present invention.

FIG. 1 shows schematically a dosing device 10, which uses the present invention in an advantageous manner. Using a transport system, for example, a conveyor belt 12, empty containers 14 are transported to a weighing station 16 which comprises a conveyor belt section 161 which is arranged on a weighing platform 162. The weighing platform 162 is supported by force introducing levers 163 of a plurality of digital weighing cells 164. In the present case, four weighing cells 164 are shown. In practical applications, more or fewer weighing cells can be used and the arrangement thereof can be adapted to the particular requirements of the specific application. The weighing cells 164 are connected to one another and to an external central control unit 18 via a data communications line 20. Each weighing cell comprises, in a manner which is not shown in detail but is known to persons skilled in the art, a sensor and a data processing device, in particular a microprocessor. The interfaces between the weighing cells 164, particularly the microprocessors thereof, and the data communications line 20 are preferably configured as RS 485 interfaces, although other types of interfaces or bus systems can be used.

In the embodiment shown, a container 14 transported on the conveyor belt section 161 is filled by a filling system 22 with a filling material 24, wherein the filling procedure is regulated by monitoring the overall weight force acting on the weighing device 16. Toward the end of the filling procedure, a closing device 26 is controlled via the central control unit 18, so that filling can be ended on reaching a target fill quantity and the container 14 can be transported away via a removal conveyor belt 28. Reaching the target fill quantity corresponds to the reaching of a target overall weight force which acts on the weighing platform 162. Since the control of the closing element 26 leads to the actual end of the filling only after an unavoidable time delay, a reliable prediction regarding the progression of the weight force acting on the weighing platform 162 is important for dosing procedures of this type.

Other applications of the present invention also include dynamic weighing such as packet weighing on conveyor systems or weighing motor vehicles on driving over a weighing platform integrated into the road.

Figure 2:
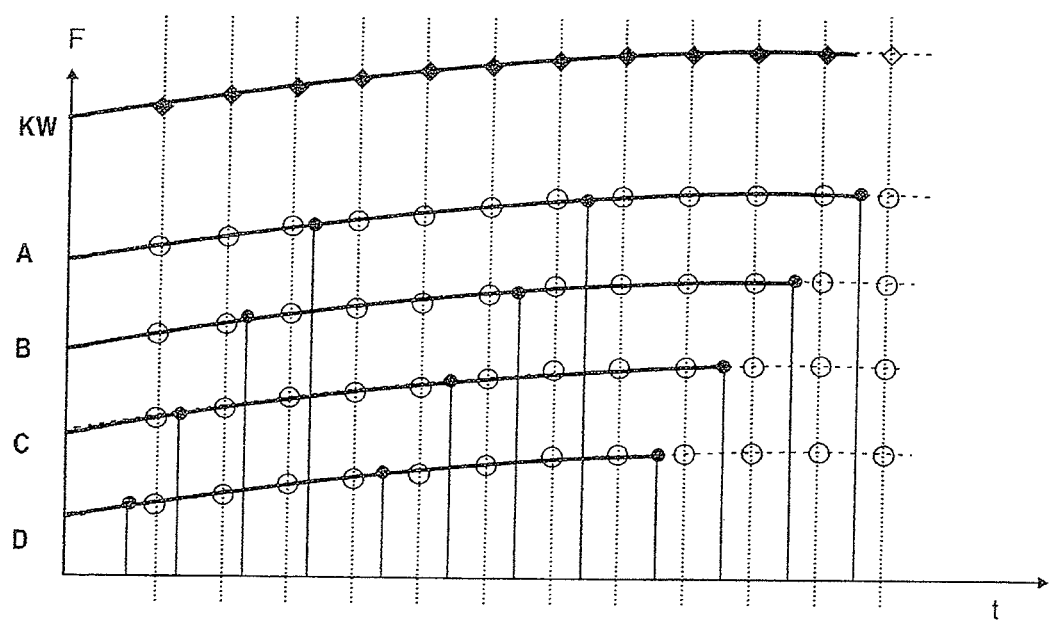
FIG. 2 is a graphical representation to illustrate the present invention.

FIG. 2 illustrates in the form of a simplified graphical representation, miscellaneous concepts underlying the present invention in connection with a dosing device as in FIG. 1. The diagram shows five graphs, each of which represents a force F as a function of time t. The representation is purely schematic and should not be understood to be correctly to scale. The graphs labeled A, B, C, D represent the forces imparted into four digital weighing cells 164 which together support a common weighing platform 162. The graph labeled KW shows the progression of the overall weight force acting on the weighing platform 162, determined from combination values of values of the force progressions A-D. The individual weighing cells 164 supply digital measurement values at different time points. These time points are shown in FIG. 2 as solid circles. According to the invention, the graphs A-D are determined individually and independently of one another as estimates based on these measurement values which serve as key points for the estimation. Estimation of the graphs A-D is carried out by interpolation between the key points (solid lines) or by extrapolation for chronological regions after the current last measurement value of the weighing cell 164 in question (dashed lines). In order to determine the total weight force, i.e., the graph KW, estimated values from all four graphs A-D which can be associated with a common time point are combined in a suitable manner, for example, by addition. These estimated values are shown in FIG. 2 as hollow circles. Their chronological relationship is illustrated by the dotted lines. Combination of estimated values associated with a common time point from all four weighing cells 164 leads to an estimated value for the overall weight force shown as a solid rhombus, i.e., to an estimated combination value. The sequence of estimated combination values can be output by the central control unit 18 as a continuously updated overall measurement result.

As clearly shown in FIG. 2, it is not necessary for actual measurement values to be used in the calculation of the combination values, although this is not excluded if the time point of a combination value to be determined coincides with a measurement time point. However, in practical applications, this is not the rule. As also shown by FIG. 2, combination values can be determined from estimated values that are based purely on interpolation, partially on interpolation and partially on extrapolation or entirely on extrapolation. The latter case leads to the combination value indicated with a hollow rhombus in the graph KW. This represents a predicted value of the overall weight force acting on the weighing platform 162. This value can be determined in various ways, one of which is the method of combining extrapolated values from the estimated progressions A-D with the process described above, or by extrapolating the progression of KW. Which variant leads to the more accurate results in an individual case may depend on the actual construction of the overall device and on the actual course of the dosing procedure, and can be chosen by a person skilled in the art taking account of these details.

For the performance of the estimation, all the estimation methods already known or yet to be developed are available to a person skilled in the art. A method which has proved itself in practice is linear interpolation or extrapolation, which involves a particularly small calculation effort and results in adequate accuracy, particularly with small distances between the individual measurement points. Increased accuracy at the cost of a greater calculation effort is provided by second and higher-order interpolations and extrapolations. For example, the methods known as spline approximations can be used. The possibility also exists of adapting to particular curve models. This method suggests itself in particular when the chronological force progressions, i.e., the force progressions in the individual weighing cells and/or the force progression of the overall weight force are theoretically well known, as can be the case, for example, in automated dosing procedures or in motor vehicle weighing devices which are driven over by the identical vehicles of a particular organization at a similar speed. In these cases, particularly high accuracy can be achieved for the estimation with relatively low calculation effort in that the estimated force progressions are, for example, estimated by minimizing mean error squares on parameterized model curves. However, the actual choice of the estimation method is of subsidiary importance for the present invention.

Naturally, the embodiments discussed in the detailed description and illustrated in the drawings are merely exemplary embodiments of the present invention. A broad spectrum of variation possibilities is open to a person skilled in the art based on the present disclosure. For instance, the number and design of the weighing cells, the estimation process actually used, the mechanical construction of the weighing system used, the technique of data communication and the definition of the detected or generated time values can be adapted by a person skilled in the art to the requirements of each individual case.

The applicant seeks, therefore, to cover all such variation possibilities as fall within the spirit and scope of the invention, as defined by the appended claims, and equivalents thereof.

What is claimed is:

1. A weighing device comprising:
   a plurality of digital weighing cells, each comprising:
   a sensor connected to a force introducing device and configured to generate a digital measurement value corresponding to an imparted force at a measurement time point,
   a data processing device configured to convert the digital measurement values to transmission units for transmission over a data communications line, and to transmit the transmission units to a central control unit connected to each of the weighing cells for analysis of the transmission units,
   wherein the central control unit calculates a digital combination value based on the transmission units originating from each of the weighing cells, and wherein the combination value represents a weight force which is exerted upon the weighing device at a weighing time point,
   wherein conversion of the measurement values to transmission units comprises pair formation with a respective one of the measurement values paired with an associated time value which represents an associated measurement time point,
   wherein the central control unit is configured to estimate a chronological progression of the force imparted into a respective one of the weighing cells from a plurality of the pairs each associated with the respective weighing cell and to generate the combination value by combining the estimated values for various ones of the weighing cells, and wherein the estimated values each correspond to the weighing time point in the estimated force progressions.

2. The weighing device as claimed in claim 1, wherein the central control unit is configured to estimate, from a plurality of the combination values, a chronological progression of the weight force exerted upon the weighing device and to predict a future time point of reaching a target weight force.

3. The weighing device as claimed in claim 1, wherein the data processing device of one of the weighing cells is configured as the central control unit.

4. The weighing device as claimed in claim 1, wherein the sensor of a respective one of the weighing cells comprises a force transducer configured to generate an analog electrical signal corresponding to the imparted force, and an analog/digital converter configured to generate the digital measurement values corresponding to the analog signal at the measurement time points.

5. The weighing device as claimed in claim 1, wherein the data processing device of each weighing cell comprises a respective timing unit configured to determine the time value representing the respective measurement time point in accordance with a time difference between a start control signal transmitted by the central control unit to the weighing cell and the measurement time point.

6. The weighing device as claimed in claim 1, wherein the data processing device of each weighing cell comprises a respective timing unit, and the timing units of all the weighing cells are synchronized with one another.

7. The weighing device as claimed in claim 1, wherein the central control unit comprises a timing unit generating the time values.

8. A method for determining a digital combination value representing a weight force which is exerted upon a weighing device at a weighing time point, comprising:
   requesting, with a central control unit, a digital measurement value from each of a plurality of weighing cells, each of the weighing cells comprising (i) a sensor connected to a force introducing device, and (ii) a data processing device,
   in each of the plurality of weighing cells:
   generating, with the sensor, a digital measurement value corresponding respectively to an imparted force at a measurement time point,
   converting, with the data processing device, the digital measurement value to a transmission unit configured to be transmitted over a data communications line, and
   transmitting, with the data processing device, the transmission unit to the central control unit for analysis, and
   calculating, with the central control unit, the digital combination value based on the transmission units originating from the weighing cells,
   wherein said converting of a measurement value into a transmission unit comprises a pair formation of the measurement value with a time value representing a time point associated with the measurement, wherein said calculating of the digital combination value comprises estimating chronological progressions of the forces imparted into individual ones of the weighing cells from a plurality of such pairs, and wherein said generating of the combination value comprises combining the estimated values for various ones of the weighing cells, the estimated values each corresponding to the respective weighing time point in the estimated force progressions.

9. The method as claimed in claim 8, further comprising:
estimating a chronological progression of the weight force exerted upon the weighing device from a plurality of combination values, and
predicting a future time point of reaching a target weight force with the central control unit.

10. The method as claimed in claim 8, wherein the data processing device of one of the weighing cells is configured as the central control unit.

11. The method as claimed in claim 8, wherein the sensor of a respective one of the weighing cells comprises a force transducer which generates an analog electrical signal corresponding to the force imparted thereon, and an analog-digital converter generates digital measurement values corresponding to the analog signal at the measurement time points.

12. The method as claimed in claim 8, wherein the time values are determined by the data processing device of each weighing cell and, in order to determine a time value representing a measurement time point, a time difference between a start control signal transmitted by the central control unit (18) to the weighing cell (164) and the measurement time point is determined.

13. The method as claimed in claim 8, wherein the time values are determined by the data processing device of each weighing cell, and the time points of all the weighing cells are synchronized with one another.

14. The method as claimed in claim 8, wherein the central control unit generates the time value.

15. The weighing device as claimed in claim 1, wherein the chronological progression is estimated through periodic interpolation using the plurality of the pairs as key values.

16. The weighing device as claimed in claim 1, wherein the chronological progression is estimated through extrapolation using the plurality of the pairs.

17. The weighing device as claimed in claim 15, wherein the chronological progression is estimated additionally through extrapolation using the plurality of the pairs.

18. The method as claimed in claim 8, wherein the chronological progressions are estimated through periodic interpolation using the plurality of the pairs as key values.

19. The method as claimed in claim 8, wherein the chronological progressions are estimated through extrapolation using the plurality of the pairs.

20. The method as claimed in claim 18, wherein the chronological progressions are estimated additionally through extrapolation using the plurality of the pairs.

* * * * *